US012806938B2

(12) United States Patent
Yu et al.

(10) Patent No.: US 12,806,938 B2
(45) Date of Patent: Nov. 24, 2026

(54) NON-PNEUMATIC TIRE

(71) Applicant: Shenzhen Daorui Tire Co., Ltd., Shenzhen (CN)

(72) Inventors: Qiansun Yu, Shenzhen (CN); Dade Chen, Shenzhen (CN)

(73) Assignee: Shenzhen Daorui Tire Co., Ltd., Shenzhen (CN)

( * ) Notice: Subject to any disclaimer, the term of this patent is extended or adjusted under 35 U.S.C. 154(b) by 218 days.

(21) Appl. No.: 18/775,760

(22) Filed: Jul. 17, 2024

(65) Prior Publication Data

US 2024/0375441 A1 Nov. 14, 2024

Related U.S. Application Data

(63) Continuation of application No. PCT/CN2022/130878, filed on Nov. 9, 2022.

(30) Foreign Application Priority Data

Jan. 20, 2022 (CN) ......................... 202210068677.3

(51) Int. Cl.
*B60C 7/12* (2006.01)
*B60B 9/10* (2006.01)

(52) U.S. Cl.
CPC . *B60C 7/12* (2013.01); *B60B 9/10* (2013.01)

(58) Field of Classification Search
CPC .. B60C 7/00; B60C 7/08; B60C 7/107; B60C 7/12; B60C 7/125; B60B 9/00; B60B 9/10
See application file for complete search history.

(56) References Cited

U.S. PATENT DOCUMENTS

| | | | | | |
|---|---|---|---|---|---|
| 1,438,070 | A * | 12/1922 | Turan | B60C 7/12 | 152/325 |
| 1,551,174 | A * | 8/1925 | Sammarone | B60B 9/22 | 152/56 |
| 6,648,039 | B1 * | 11/2003 | Bina | B60C 3/00 | 152/157 |
| 9,481,208 | B2 * | 11/2016 | Matsuda | B60C 7/125 | |
| 2020/0139763 | A1 * | 5/2020 | Youn | B60C 7/125 | |

FOREIGN PATENT DOCUMENTS

| | | | |
|---|---|---|---|
| CN | 2465962 | Y | * 12/2001 |
| CN | 107571689 | A | 1/2018 |
| CN | 110978892 | A | 4/2020 |
| CN | 111409395 | A | 7/2020 |

* cited by examiner

*Primary Examiner* — S. Joseph Morano
*Assistant Examiner* — Taekwon Choi
(74) *Attorney, Agent, or Firm* — JEEN IP LAW, LLC

(57) ABSTRACT

A non-pneumatic tire, including a tread (10), an inner ring (20) and a plurality of groups of bulges (30). The plurality of groups of bulges (30) are radially distributed, each group of bulges (30) is hollowed out inside, and an annular cavity (40) and a depression (50) are formed between the adjacent groups of bulges (30), the depressions (50) form a tightening inner brim (41) corresponding to an inner wall of the annular cavity (40), an inner wall of each group of bulges (30) forms an expanding outer brim (42), and a bulge wall of each group of bulges (30) forms an arc-shaped extension surface (43); and a tire wall (60) connected between the tread (10) and the inner ring (20) is formed between the tightening inner brims (41) and the tops of the outer walls of the bulges (30).

15 Claims, 8 Drawing Sheets

NON-PNEUMATIC TIRE

CROSS-REFERENCE TO RELATED APPLICATIONS

The application claims priority to Chinese patent application No. 2022100686773, filed on Jan. 20, 2022, the entire contents of which are incorporated herein by reference.

TECHNICAL FIELD

The present invention relates to the technical field of tire manufacturing, and in particular to a non-pneumatic tire.

BACKGROUND

Tire is a generic term. The tires, usually made of wear rubber materials, can be divided into a pneumatic tire and a solid tire. Sufficient gas can provide a comfortable support in a sealed rubber tire cavity. The disadvantage of the pneumatic tire is that the rubber material of a tread is easy to wear, and there is a possibility of tire burst because of the pneumatic support. Although the solid tire does not need to be inflated and has no possibility of tire burst and has high load-bearing capacity, the solid tire lacks air as a buffer, which causes poor driving comfort of a vehicle. Therefore, there is an urgent need for a non-pneumatic tire, which can not only keep an original solid tire flat-free, but also has good load-bearing capacity and road driving comfort.

SUMMARY

In view of this, to overcome the defects existing in prior art, the present invention mainly aims at providing a non-pneumatic tire, by means of which, a wall thickness of the tire is increased, and a plurality of load-bearing units are formed by arranging a plurality of groups of bulges between a tread and an inner ring, thereby improving the overall load-bearing capacity, the impact resistance and the driving comfort of the tire.

To achieve the purposes above, the present invention adopts the following technical solution.

A non-pneumatic tire, including a tread and an inner ring with a common circle center, and a plurality of groups of bulges radially and integrally connected between the tread and the inner ring with the center of the tread and the inner ring as a center, where the plurality of groups of bulges are radially distributed between the tread and the inner ring, each group of bulges is hollowed out inside, and adjacent groups of bulges are integrally connected to form an annular cavity which extends through the plurality of groups of bulges and surrounds between the tread and the inner ring; a depression is formed at a connection position of the adjacent groups of bulges, the depressions form a tightening inner brim corresponding to an inner wall of the annular cavity, a top contour of an inner wall of each group of bulges correspondingly forms an expanding outer brim of the annular cavity, and a bulge wall of each group of bulges forms an arc-shaped extension surface integrally connected between the tightening inner brim and the expanding outer brim; and a tire wall connected between the tread and the inner ring is formed between the tightening inner brims of the annular cavities and the tops of the outer walls of the bulges, which tire wall includes an outer side tire wall connected between the tread and an outer side rim of the inner ring and an inner side tire wall connected between the tread and an inner side rim of the inner ring.

As a preferred solution, a first pressure-bearing unit is at a connection part between the bulges at a top of each group of bulges and the tread when the tire is loaded, the arc-shaped extension surface is a second pressure-bearing unit, the tightening inner brim is a third pressure-bearing unit; and the first pressure-bearing unit, the second pressure-bearing unit and the third pressure-bearing unit are integrally connected from outside to inside.

As a preferred solution, each group of bulges is symmetrically distributed on two sides of the tread and the inner ring with a central plane of the tread and the inner ring perpendicular to an axial direction as a center, and the adjacent bulges located on a same side of the central plane are connected in a radially continuous manner and extend through the tread and the inner ring.

As a preferred solution, the outer wall of each bulge is spherical.

As a preferred solution, a cross section of the tightening inner brim is in a closed ring shape.

As a preferred solution, protrusions for elastic contact with a wheel are disposed at an inner side wall of the inner ring.

As a preferred solution, a plurality of the protrusions are disposed at the inner side wall of the inner ring at intervals along a circumferential direction of the inner ring, and unloading grooves are formed between adjacent protrusions and facilitate stretching the tire for rapid assembly when assembling the tire and the wheel.

As a preferred solution, a first contact part for cooperating with a rim of the wheel and a second contact part for contacting with a wall of a wheel groove are disposed on either side of the protrusion of the inner ring, along a width direction of the inner ring, the first contact part and the second contact part are connected in a stepped manner, and the first contact part is located on an outer side of the second contact part.

As a preferred solution, the tread is arc-shaped along a width direction of the tread, and sipes respectively extend to the two sides of the tread at a middle position of the tread.

As a preferred solution, a first air hole for forming air convection with the wheel is formed in the inner ring.

As a preferred solution, the outer side tire wall and the inner side tire wall are respectively provided with second air holes, and the second air holes in the outer side tire wall and the second air holes in the inner side tire wall are symmetrical or asymmetrical with each other.

As a preferred solution, a depth of the sipes gradually decreases from edges of the two sides of the tread to the middle position of the tread.

As a preferred solution, a thickness of a depression central region of the depression is 2-7 times a wall thickness of the bulge.

As a preferred solution, each group of bulges includes four bulges, the four bulges are pairwise symmetrically distributed on the two sides of the tread and the inner ring with a central plane of the tread and the inner ring perpendicular to an axial direction as a center, and the two adjacent bulges located on a same side of the central plane are connected in a radially continuous manner and extend through the tread and the inner ring.

As a preferred solution, the protrusion is spherical, semi-spherical or ellipsoidal, and a surface of the protrusion that contacts the rim of a wheel is flat or spherical.

Compared with the prior art, the present invention has obvious advantages and beneficial effects. Specifically, according to the technical solution, it can be known that the plurality of groups of mutually connected bulges are radially distributed between the tread and the inner ring, and the plurality of groups of bulges form a concave-convex structure on the outer side wall of the tire, and form inside a load-bearing structure with the tightening inner brim, the expanding outer brim and the arc-shaped extension surface as load-bearing units; the concave-convex design increases the width of the tire wall of the tire and the load-bearing area of the tire wall of the tire, so that the overall load-bearing capacity of the tire is enhanced; moreover, the depression in the tire wall can provide a strong supporting point for the tire when the tire is deformed under pressure, so that the load-bearing capacity and the impact resistance of the tire are further improved; and the internal load-bearing structure with multiple load-bearing units has high force transmission speed and high elastic deformation acceleration, which can provide enough elastic support when the tire is compressed and improve the driving comfort.

To more clearly illustrate the structural features and effects of the present invention, the following detailed description is given with reference to the accompanying drawings and specific embodiments.

DESCRIPTION OF NUMERAL REFERENCES

10. tread; 11. sipe; 12. tread middle part; 20. inner ring; 21. protrusion; 22. unloading groove; 23. first contact part; 24. second contact part; 25. first air hole; 30. bulge; 40. annular cavity; 41. tightening inner brim; 42. expanding outer brim; 43. arc-shaped extension surface; 50. depression; 51. depression central region; 60. tire wall; 61. outer side tire wall; 62. inner side tire wall; 63. second air hole; 70. first pressure-bearing unit; 100. wheel; a. axial direction; b. central plane; c. width direction.

DETAILED DESCRIPTION OF THE EMBODIMENTS

Figure 1:
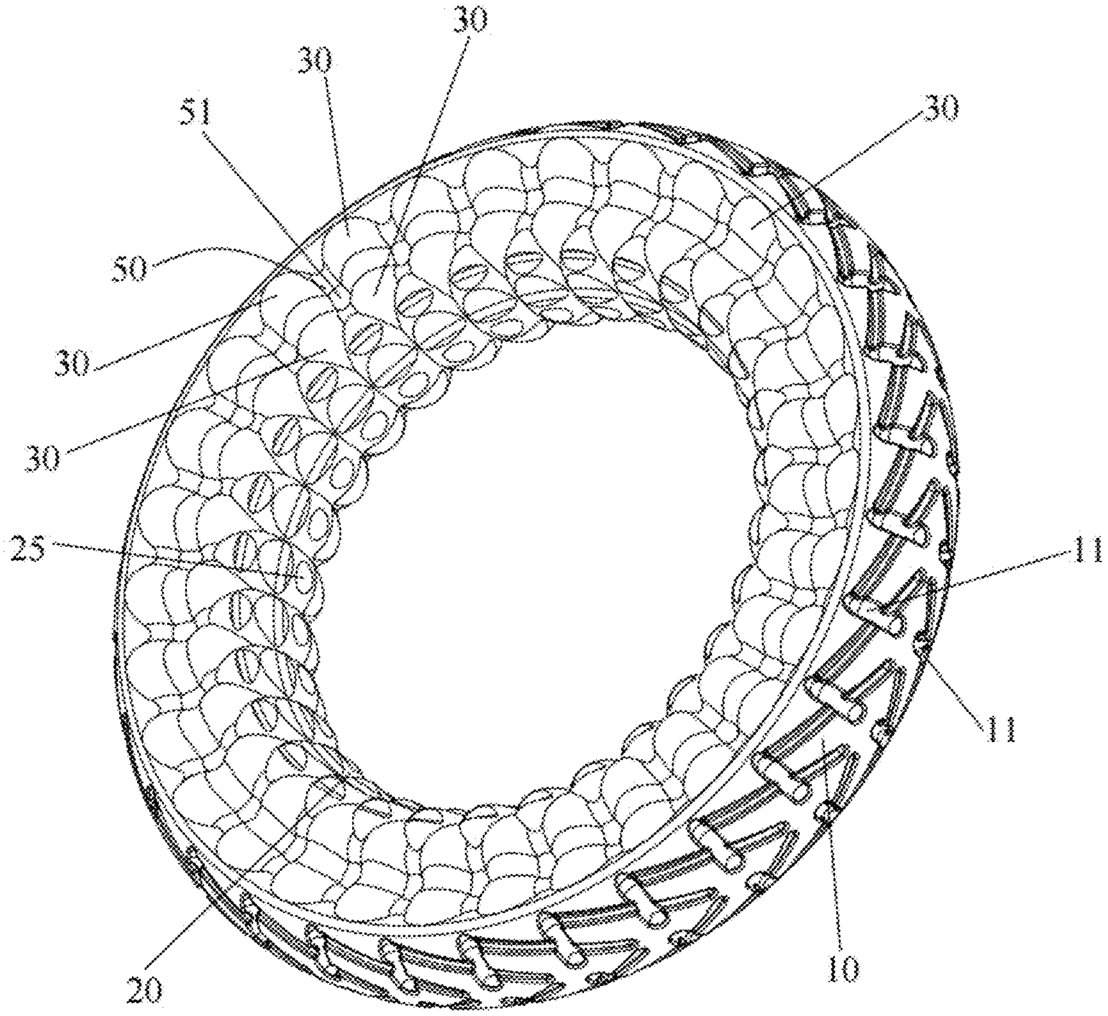
FIG. 1 is a perspective view of a tire of the present invention.
Figure 2:
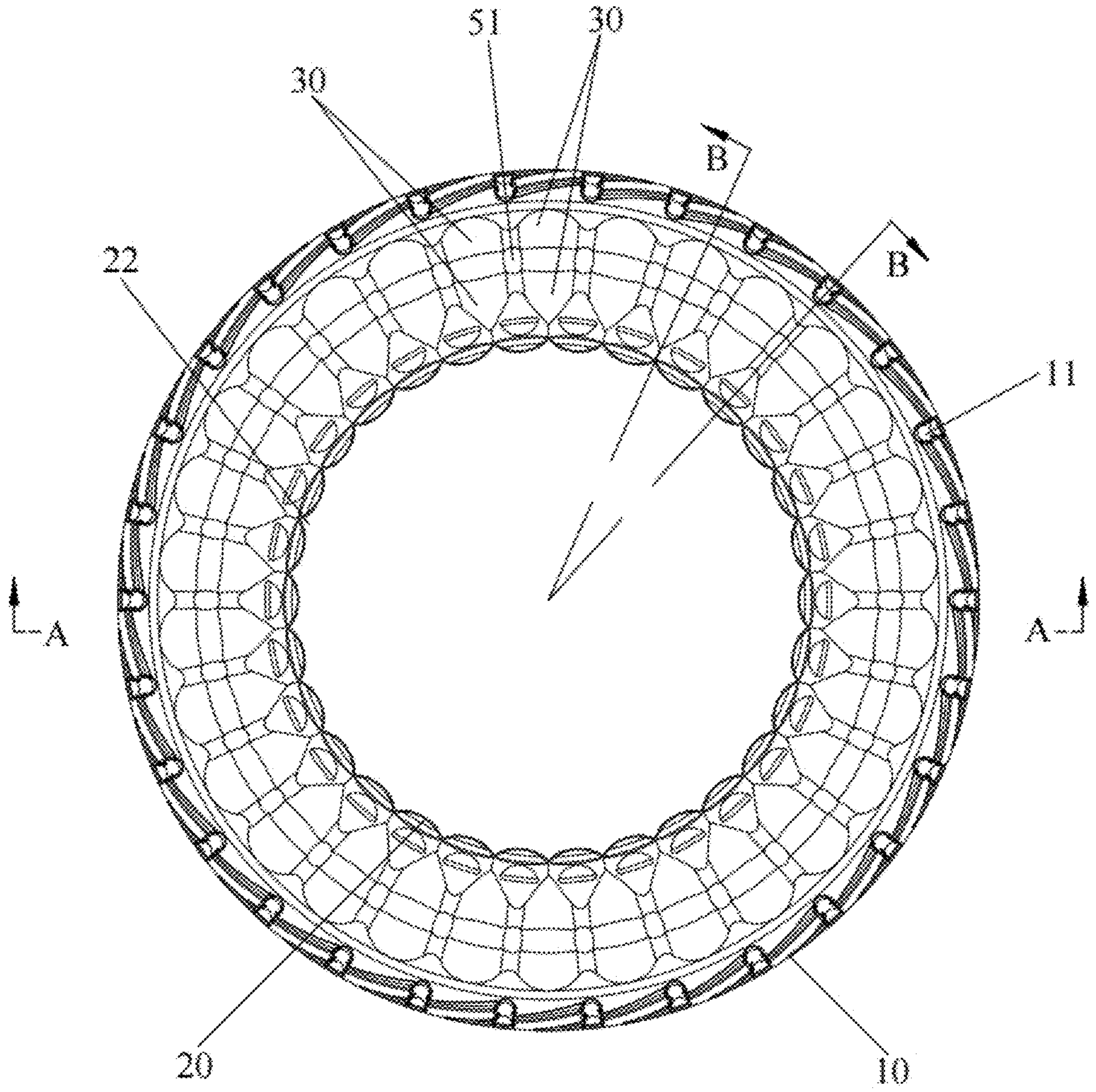
FIG. 2 is a schematic plan view of the tire of the present invention.
Figure 3:
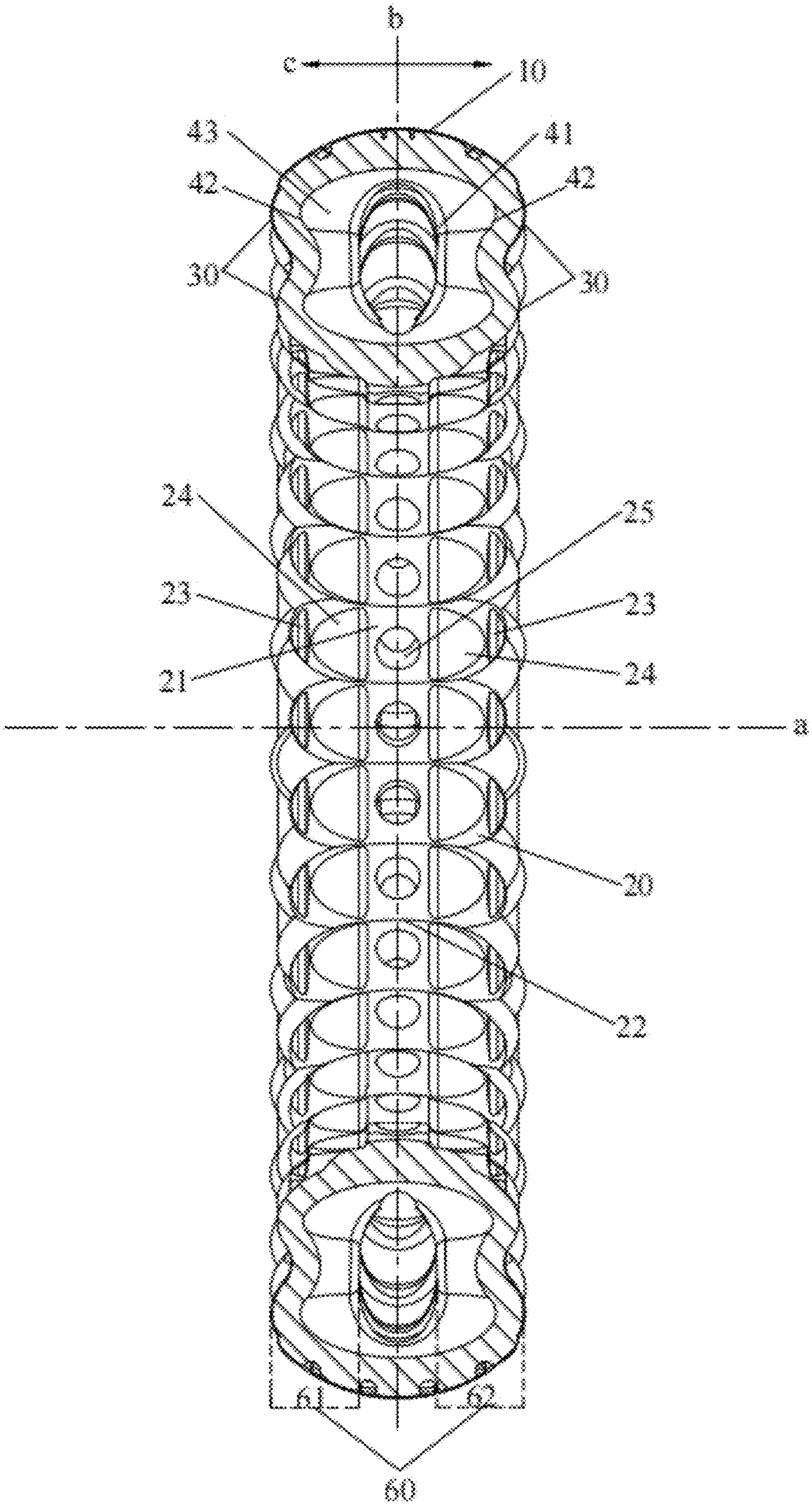
FIG. 3 is a schematic sectional view taken at A-A of FIG. 2.
Figure 4:
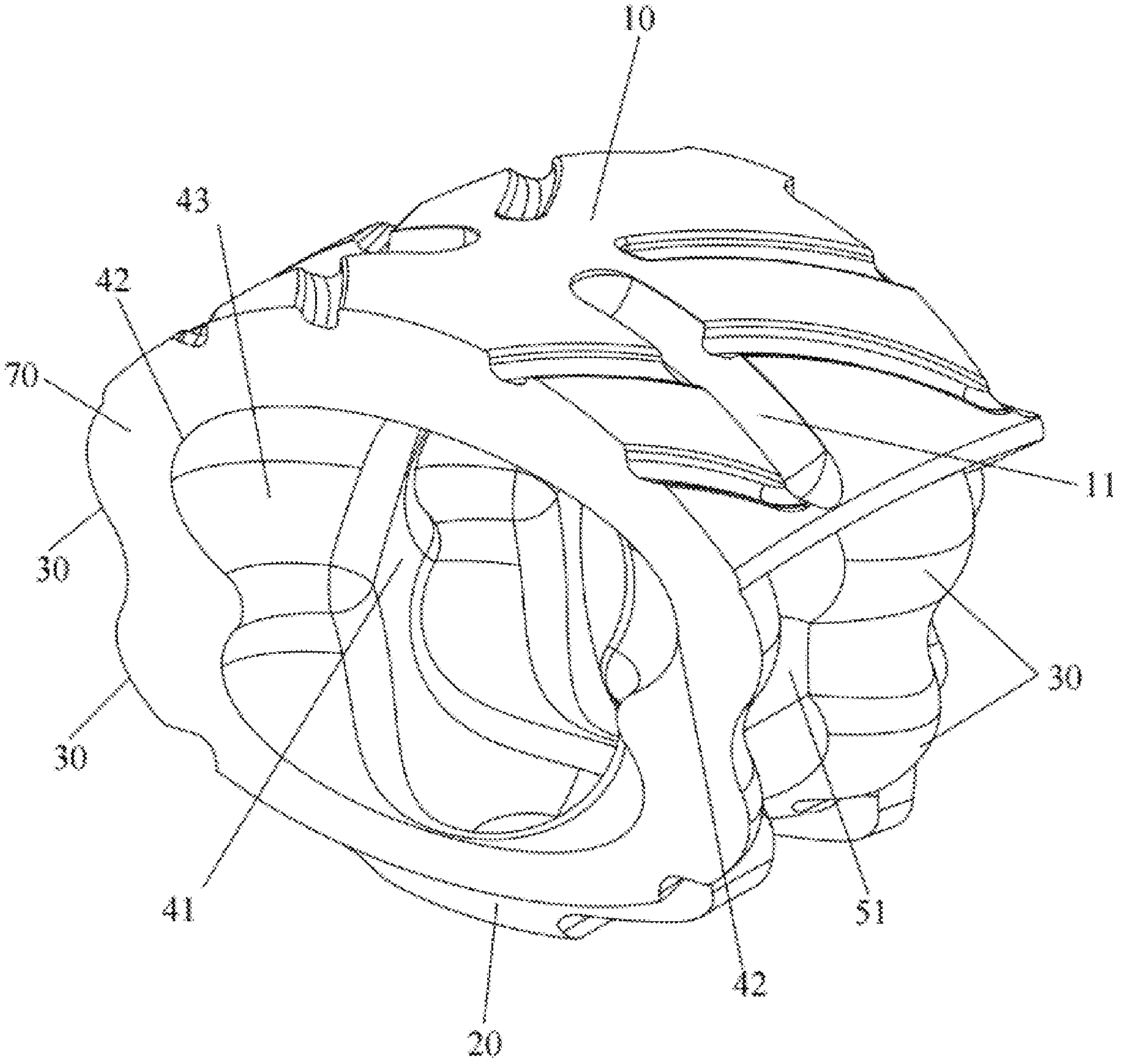
FIG. 4 is a perspective view of a cross section taken along B-B of FIG. 2 from a first perspective.
Figure 5:
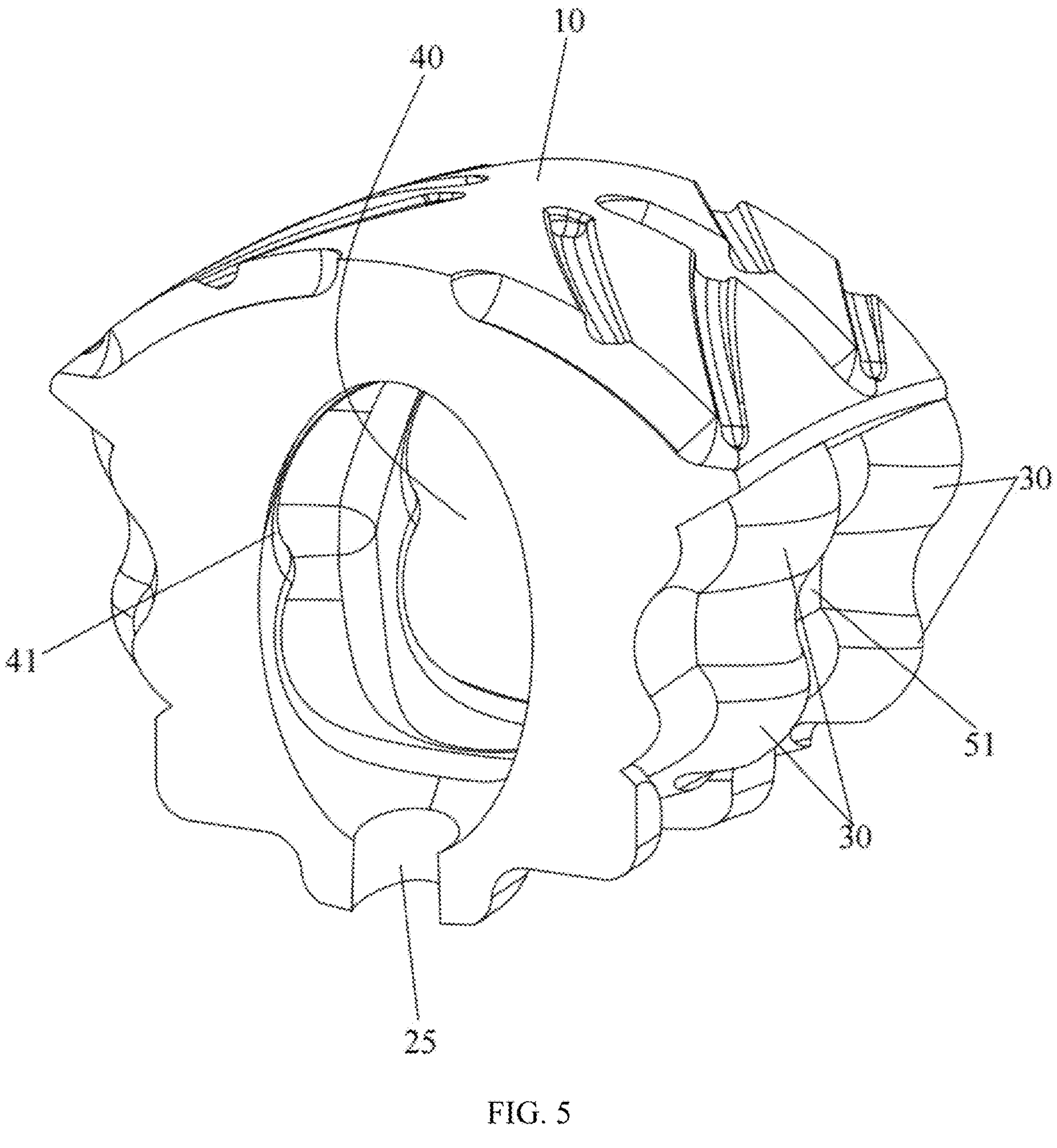
FIG. 5 is a perspective view of the cross section taken along B-B of FIG. 2 from a second perspective.
Figure 6:
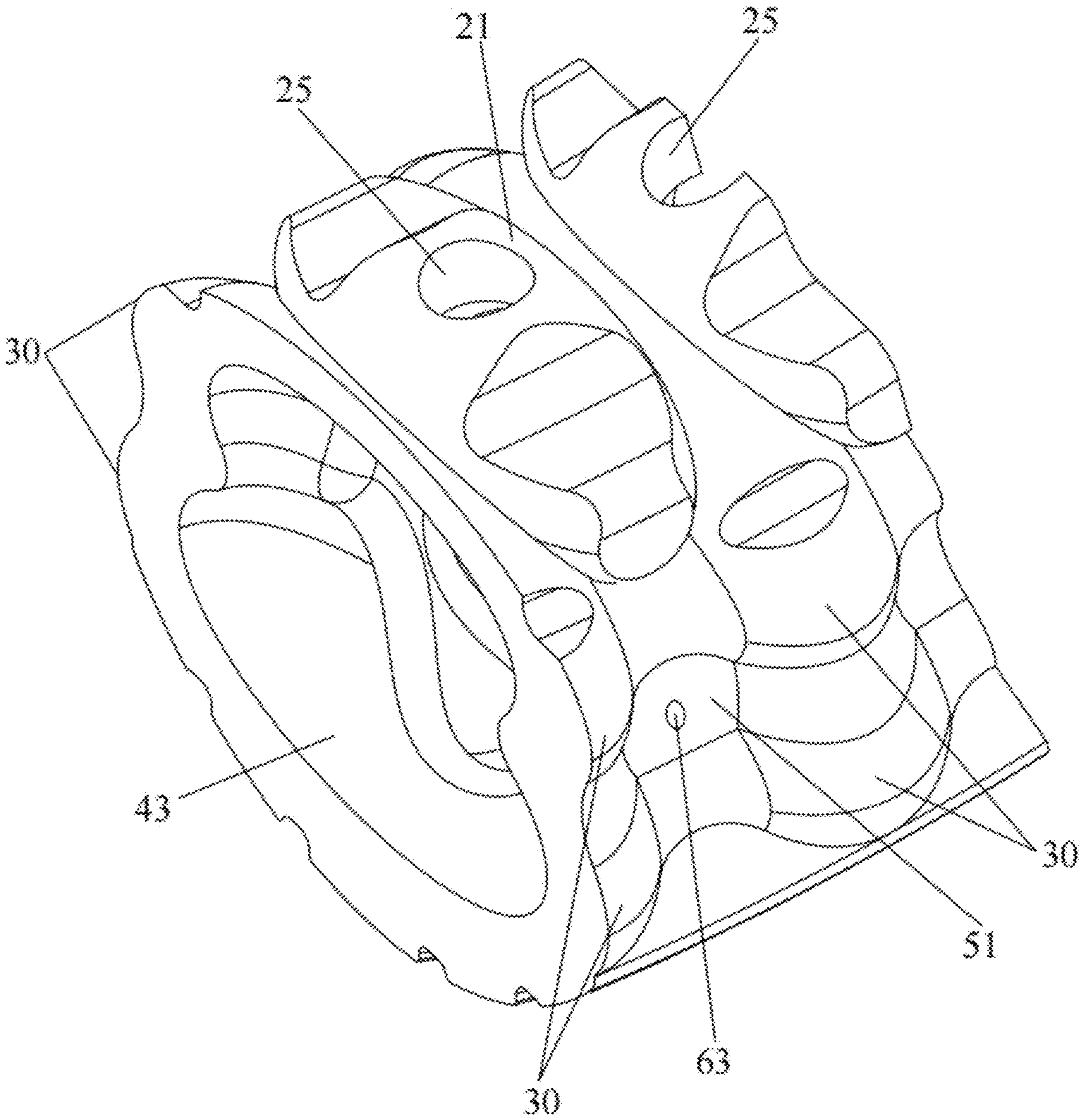
FIG. 6 is a perspective view of the cross section taken along B-B of FIG. 2 from a third perspective.
Figure 7:
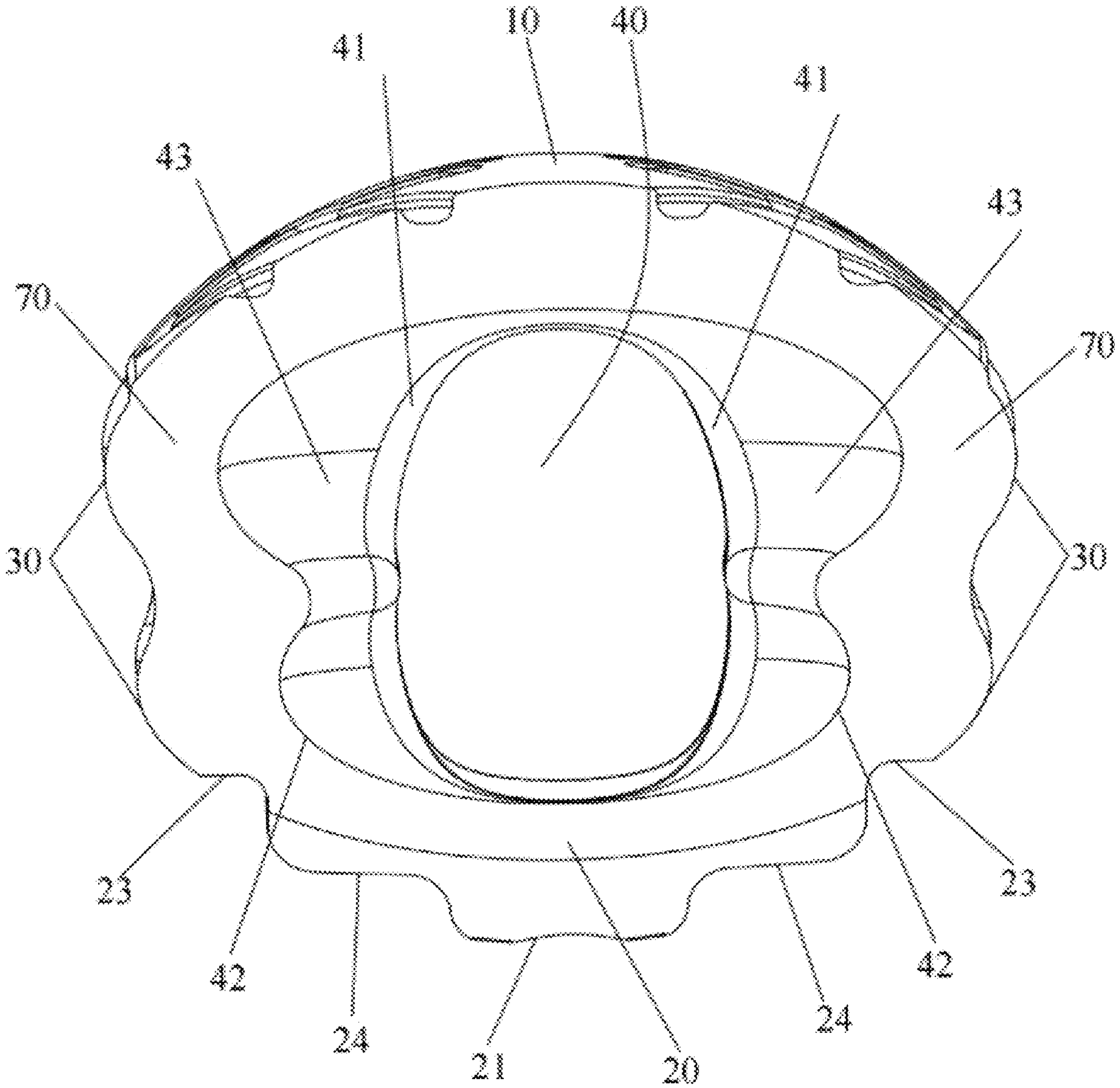
FIG. 7 is a perspective view of the cross section taken along B-B of FIG. 2 from a fourth perspective.
Figure 8:
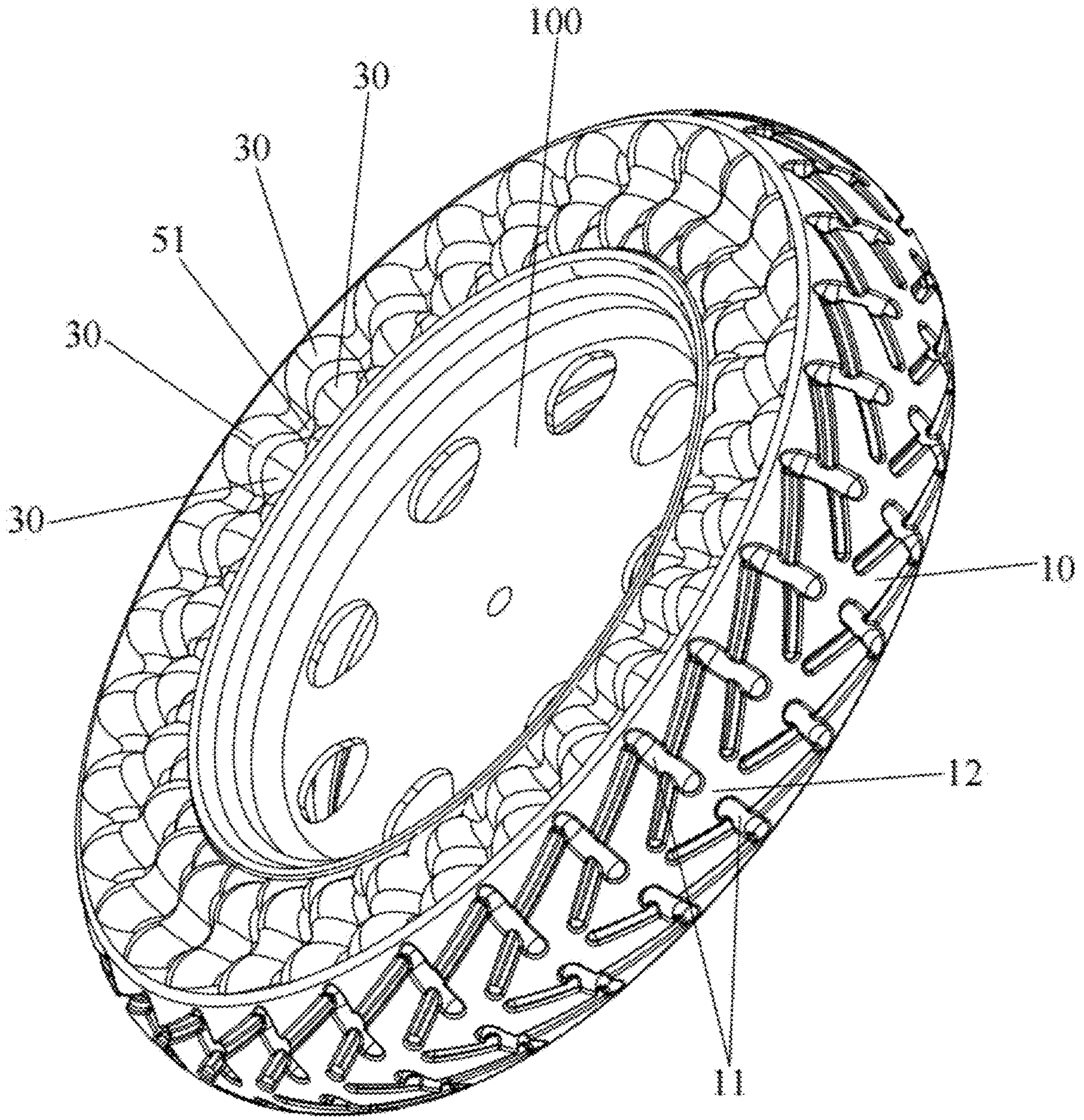
FIG. 8 is a schematic diagram of the cooperation between the tire and a wheel of the present invention.

As shown in FIGS. 1 to 8, the present invention discloses a non-pneumatic tire, including a tread 10 and an inner ring 20 with a common circle center, and a plurality of groups of bulges 30 radially and integrally connected between the tread 10 and the inner ring 20 with the center of the tread 10 and the inner ring 20 as a center, where, the tire is a hand cart tire mainly applied to tools such as an electric motorcycle, a motorcycle, a bicycle, a scooter and a tricycle, and can also be applied to a compact car; the tire is made of an elastic material, preferably polyurethane, rubber and plastics.

The tread 10 is a surface that contacts the ground during the running of the tire, and the tread 10 is designed in an arc shape along a width direction c of the tread, and the arc design is mainly used for a turning operation of a two-wheeled vehicle. A position of the tread 10 closer to an edge has much greater thickness than other positions of the tread. With respect to the positions with greater thicknesses, when the tread 10 is stressed, a middle position of the tread 10 is first stressed and deformed, while the edge of the tread 10 is not easy to deform due to its thickness, which easily causes jolts. Sipes 11 are formed at the edge positions with greater thicknesses, and a depth of each sipe 11 is set to gradually decrease from the edge to a tread middle part 12 (it may also be the same depth), so that the cushioning performance of the tire when stressed is improved and the comfort is improved when the tread 10 touches the ground.

The inner ring 20 is an annular structure which is tightly matched with the wheel 100 of the vehicle, and protrusions 21 for elastic contact with the wheel 100 are disposed at an inner side wall of the inner ring 20; in this embodiment, a plurality of protrusions 21 are disposed at the inner side wall of the inner ring 20 at intervals along a circumferential direction of the inner ring 20, and an unloading groove 22 is formed between every two adjacent protrusions 21. When the tire and the wheel are assembled, it is necessary to stretch the tire so that the tire can be elastically deformed and sleeve the wheel, thereby achieving rapid assembly of the tire and the wheel 100. The unloading grooves 22 are mainly used to provide a deformation space in this assembly process for unloading an internal stress during tire stretching, so as to improve the ease and convenience of the assembly of the tire and the wheel 100.

A first contact part 23 for cooperating with a rim of the wheel 100 and a second contact part 24 for contacting with a wall of a wheel groove are disposed on either side of the protrusion 21 of the inner ring 20, along the width direction c of the inner ring 20, the first contact part 23 and the second contact part 24 are connected in a stepped manner, and the first contact part 23 is located on an outer side of the second contact part 24. Moreover, the protrusion 21 and the first contact parts 23 and the second contact parts 24 on the two sides of the protrusion are distributed side by side along the width direction c of the inner ring 20. The purpose of adopting the protrusion 21 and the plurality of contact parts is to allow the inner ring 20 to be more closely combined with the wheel, and at the same time to achieve cushioning elasticity between the tire and the wheel; it should be noted that the number of the projection 21 and the contact parts which are distributed side by side can be set according to actual needs. In this embodiment, a total of five parts, namely, the protrusion 21 disposed in the middle and the first contact parts 23 and the second contact parts 24 disposed on the two sides of the protrusion, are adopted, and at least one or two of the five parts are in elastic contact with an inner wall of the wheel groove. Moreover, a shape of the protrusion 21 may be spherical, semi-spherical or ellipsoidal, and a surface of the protrusion 21 that contacts with the rim is flat or spherical. In addition, the first contact parts 23 on the two sides are mainly used to form a close fit with rims of the two sides of the wheel, and the second contact parts 24 on the two sides are mainly used to fill a gap between the protrusion 21 and the inner wall of the wheel groove to achieve full adhesion between the tire and the wheel, so as to improve the tightness and fastening of the combination of the tire and the wheel, increase a friction force between the tire and the wheel, prevent the tire from slipping and being separated from the wheel due to greater torsion during the running of the wheel, and prolong the service life of the tire. Meanwhile, the protrusion 21 and the plurality of contact parts are in elastic contact with the wheel, which can improve the overall elasticity of the tire, further reduce and filter out rigid vibration caused by road conditions, and improve the riding comfort.

In addition, a first air hole 25 for forming air convection with the wheel is formed in a surface of the inner ring 20 that contacts with the wheel. In this embodiment, the first air hole 25 may be formed in the protrusion 21, or between the protrusion 21 and the second contact part 24, between the first contact part 23 and the second contact part 24, or between two adjacent protrusions 21 along the circumferential direction of the inner ring 20; meanwhile, the matched wheel is also provided with vent holes at intervals to cooperate with the first air holes 25 on the tire to form air convection among the tire, the wheel and the outside, so as to dissipate hot air inside the tire, reduce heat generated by material accumulation inside the tire, and prolong the service life of the tire.

The plurality of groups of bulges 30 are radially distributed between the tread 10 and the inner ring 20; each group of bulges 30 is symmetrically distributed on the two sides of the tread 10 and the inner ring 20 with a central plane b of the tread 10 and the inner ring 20 perpendicular to an axial direction a as the center; it should be noted that each group of bulges 30 may also be asymmetrically disposed on the two sides of the central plane b (the two sides of the tread 10 and the inner ring 20) as required; and each group of bulges 30 is hollowed out inside, and two adjacent groups of bulges 30 are integrally connected to form an annular cavity 40 which runs through the groups of bulges 30 and surrounds between the tread 10 and the inner ring 20. Each group of bulges 30 has four bulges 30, the four bulges 30 are pairwise symmetrically distributed on the two sides of the central plane b of the tread 10 and the inner ring 20 perpendicular to the axial direction, the two bulges 30 located on a same side of the central plane b are connected in a radially continuous and manner and extend through the tread 10 and the inner ring 20, and the outer wall of each bulge 30 is in a spherical shape or other convex shapes. A depression 50 is formed at a connection position of two adjacent groups of bulges 30 (a thickness of a depression central region 51 is 2-7 times of a wall thickness of the bulge 30, the purpose of designing the thicker depression central region 51 is to make the depression central region form a strong supporting point for elastic deformation of the tire under pressure and to improve the overall load-bearing capacity and the impact resistance of the tire), and the depression 50 forms a tightening inner brim 41 corresponding to an inner wall of the annular cavity 40 (a cross section of the tightening inner brim 41 is in a closed ring shape, such as an ellipse and a peanut shell shape), and a position of the tightening inner brim 41 corresponding to the depression central region 51 may be a plane, and may also in a form of the plane and an arc combined. A top contour of an inner wall of each group of bulges 30 correspondingly forms an expanding outer brim 42 of the annular cavity 40 and a bulge wall of each group of bulges 30 forms an arc-shaped extension surface 43 integrally connected between the tightening inner brim 41 and the expanding outer brim 42; it should be noted that the smaller the cross-sectional area (a cross section along a width direction c of the tire) of the tightening inner brim 41, the larger the area of the arc-shaped extension surface 43, correspondingly, the greater a thickness of a tire wall 60 described below, the larger an area of a load-bearing unit that can support a pressure load of the tire, and the higher the supporting performance of the tire, so that the overall load-bearing performance of the tire is higher.

The sipe 11 disposed on the tread 10 can be used as both a drainage groove and a functional groove of the tire; specifically, a position of the sipe 11 corresponds to a position where the bulge 30 is located, and when the bulge 30 is elastically deformed under pressure, the sipe 11 can be used as an unloading groove for unloading a deformation stress of the bulge 30, so that the deformation stress of the bulge 30 can be quickly removed when the tire is running, the influence on the driving experience during the elastic deformation of the tire is reduced and the driving comfort is improved.

A concave-convex (a plurality of bulges 30 and depressions 50 combined) tire wall 60 connected between the tread 10 and the inner ring 20 is formed between the tightening inner brim 41 of the annular cavity 40 and the top of the outer wall of the bulge 30, and the tire wall 60 includes an outer side tire wall 61 connected between the tread 10 and an outer side rim of the inner ring 20 and an inner side tire wall 62 connected between the tread 10 and an inner side rim of the inner ring 20.

A first pressure-bearing unit 70 is at a connection part between the bulges 30 at a top of each group of bulges 30 and the tread 10 when the tire is loaded, the arc-shaped extension surface 43 is a second pressure-bearing unit, the tightening inner brim 41 is a third pressure-bearing unit; and the first pressure-bearing unit 70, the second pressure-bearing unit and the third pressure-bearing unit are integrally connected from outside to inside. The three pressure-bearing units transfer loads to each other and support each other elastically, so that greater elasticity and load-bearing capacity are formed. Moreover, by adopting the design of a plurality of arc-shaped extension surfaces 43, the thickness of the tire wall can be increased, the load-bearing area of the tire wall can be increased, and the load per unit area can be reduced, so that the overall load-bearing capacity of the tire can be improved. Therefore, the thickness of the tread 10 can be reduced under the same supporting strength, and the comfort of the tread 10 when it contacts the ground can be improved; meanwhile, the thickness of the tread 10 can be increased as needed to further improve the tire supporting strength. Moreover, the concave-convex design of the tire wall can improve the elasticity and rebound acceleration of the tire to adapt to different road conditions when the tire is running under a load; the plurality of depressions 50 on the tire wall 60 can form a plurality of supporting points, thereby further improving the overall load-bearing capacity and impact resistance of the tire. Compared with a honeycomb- and V-shaped through-type non-pneumatic tire, this tire has a concave-convex structure formed by the plurality of bulges that are integrally connected at the tire wall, and the bulges and the depressions strongly support each other to form a plurality of elastic supporting structures, so that the force transmission is faster, the rebound acceleration is high, the tire can adapt to various harsh road conditions, the overall load-bearing performance and the impact resistance of the tire are improved, and the driving experience is better. Moreover, a projected width of the tire wall of the tire in a wheel rotation direction (that is, a distance from an apex of the bulge outer wall to the tightening inner brim) is equivalent to 2-7 times a width of a tire wall of a traditional pneumatic tire of the same model, so that a load-bearing area of the tire wall of the tire is expanded, the overall structural strength of the tire is improved and the load-bearing capacity of the tire is further enhanced.

The outer side tire wall 61 and the inner side tire wall 62 are respectively provided with second air holes 63, and the second air holes 63 in the outer side tire wall 61 and the second air holes 63 in the inner side tire wall 62 are symmetrical or asymmetrical with each other. Specifically, the second air hole 63 is formed at a position of the depression 50 of the tire wall, and the second air hole 63 can cooperate with the first air hole 25 to achieve rapid air convection between the inside of the tire and outside air, so as to improve the emission efficiency of hot air inside the tire.

The number of the groups of bulges 30 of the tire is between 6 and 60, which can be designed according to actual needs. The tread 10, the inner ring 20 and the groups of bulges 30 of the tire are all integrally designed, so that the overall structure is stable.

When the hardness of the tire material is Shore 85, under a test by a dynamic tire durability tester: under the condition of carrying 150 KG load and passing through 5*5 (5 mm high and 5 mm wide) obstacle blocks, the tire runs continuously for 3000 kilometers at a speed of 40 kilometers per hour, and the tire has no damage.

The design focus of the present invention lies in that the plurality of groups of mutually connected bulges 30 are radially distributed between the tread 10 and the inner ring 20, and the plurality of groups of bulges 30 form a concave-convex structure on the outer side wall of the tire, and form inside a load-bearing structure with the tightening inner brim 41, the expanding outer brim 42 and the arc-shaped extension surface 43 as load-bearing units; the concave-convex design increases the width of the tire wall of the tire and the load-bearing area of the tire wall of the tire, so that the overall load-bearing capacity of the tire is enhanced; moreover, the depression 50 in the tire wall can provide a strong supporting point for the tire when the tire is deformed under pressure, so that the load-bearing capacity and the impact resistance of the tire are further improved; and the internal load-bearing structure with multiple load-bearing units has high force transmission speed and high elastic deformation acceleration, which can provide enough elastic support when the tire is compressed and improve the driving comfort.

The above description is only a preferred embodiment of the present invention, and is not intended to limit the technical scope of the present invention, so that any minor modifications, equivalent changes and modifications made to the above embodiment according to the technical spirit of the present invention are within the technical scope of the present invention.

What is claimed is:

1. A non-pneumatic tire, comprising a tread and an inner ring with a common circle center, and a plurality of groups of bulges radially and integrally connected between the tread and the inner ring about the common circle center, wherein the plurality of groups of bulges are radially distributed between the tread and the inner ring, each group of bulges is hollowed out inside, and adjacent groups of bulges are integrally connected to form an annular cavity which extends through the plurality of groups of bulges and extends circumferentially between the tread and the inner ring; a depression is formed at a connection position of the adjacent groups of bulges, the depressions form a tightening inner brim corresponding to an inner wall of the annular cavity, a top contour of an inner wall of each group of bulges correspondingly forms an expanding outer brim of the annular cavity, and a bulge wall of each group of bulges forms an arc-shaped extension surface integrally connected between the tightening inner brim and the expanding outer brim; and a tire wall connected between the tread and the inner ring is formed between the tightening inner brims of the annular cavities and tops of the outer walls of the bulges, which the tire wall comprises an outer side tire wall connected between the tread and an outer side rim of the inner ring and an inner side tire wall connected between the tread and an inner side rim of the inner ring.

2. The non-pneumatic tire according to claim 1, wherein a first pressure-bearing unit is at a connection part between the bulges at a top of each group of bulges and the tread when the tire is loaded, the arc-shaped extension surface is a second pressure-bearing unit, the tightening inner brim is a third pressure-bearing unit; and the first pressure-bearing unit, the second pressure-bearing unit and the third pressure-bearing unit are integrally connected from outside to inside.

3. The non-pneumatic tire according to claim 1, wherein each group of bulges is symmetrically distributed on two sides of the tread and the inner ring with a central plane of the tread and the inner ring perpendicular to an axial direction as a center, and adjacent bulges located on a same side of the central plane are connected in a radially continuous manner and extend through the tread and the inner ring.

4. The non-pneumatic tire according to claim 1, wherein the outer wall of each bulge is spherical.

5. The non-pneumatic tire according to claim 1, wherein a cross section of the tightening inner brim is in a closed ring shape.

6. The non-pneumatic tire according to claim 1, wherein protrusions for elastic contact with a wheel are disposed at an inner side wall of the inner ring.

7. The non-pneumatic tire according to claim 6, wherein a plurality of the protrusions are disposed at the inner side wall of the inner ring at intervals along a circumferential direction of the inner ring, and unloading grooves are formed between adjacent protrusions and facilitate stretching the tire for rapid assembly when assembling the tire and the wheel.

8. The non-pneumatic tire according to claim 6, wherein a first contact part for cooperating with a rim of the wheel and a second contact part for contacting with a wall of a wheel groove are disposed on either side of the protrusion of the inner ring, along a width direction of the inner ring, the first contact part and the second contact part are connected in a stepped manner, and the first contact part is located on an outer side of the second contact part.

9. The non-pneumatic tire according to claim 1, wherein the tread is arc-shaped along a width direction of the tread, and sipes respectively extend to two sides of the tread at a middle position of the tread.

10. The non-pneumatic tire according to claim 1, wherein a first air hole for forming air convection with a wheel is formed in the inner ring.

11. The non-pneumatic tire according to claim 10, wherein the outer side tire wall and the inner side tire wall are respectively provided with second air holes, and the second air holes in the outer side tire wall and the second air holes in the inner side tire wall are symmetrical or asymmetrical with each other.

12. The non-pneumatic tire according to claim 9, wherein a depth of the sipes decreases from edges of the two sides of the tread to the middle position of the tread.

13. The non-pneumatic tire according to claim 1, wherein a thickness of a depression central region of the depression is 2-7 times a wall thickness of the bulge.

14. The non-pneumatic tire according to claim 1, wherein each group of bulges comprises four bulges, the four bulges are pairwise symmetrically distributed on two sides of the tread and the inner ring with a central plane of the tread and the inner ring perpendicular to an axial direction as a center, and two adjacent bulges located on a same side of the central plane are connected in a radially continuous manner and extend through the tread and the inner ring.

15. The non-pneumatic tire according to claim 6, wherein the protrusion is spherical, semi-spherical or ellipsoidal, and a surface of the protrusion that contacts the rim of a wheel is spherical.

* * * * *